United States Patent [19]

Yamamoto

[11] Patent Number: 4,733,588
[45] Date of Patent: Mar. 29, 1988

[54] GUIDE REGULATOR PLATE FOR VEGETABLE PREPARING DEVICES

[76] Inventor: Keiji Yamamoto, 7-7-31, Nishimi Iwakuni-shi, Yamaguchi-ken, Japan

[21] Appl. No.: 913,474

[22] Filed: Sep. 30, 1986

[51] Int. Cl.$^4$ .............................................. B26D 1/03
[52] U.S. Cl. ........................................ 83/857; 83/856
[58] Field of Search ......................... 83/856, 857, 858

[56] References Cited

U.S. PATENT DOCUMENTS

| | | | |
|---|---|---|---|
| 66,402 | 7/1867 | Schwartz | 83/856 |
| 557,914 | 4/1896 | Struble et al. | 83/858 X |
| 4,570,519 | 2/1986 | Motosko, II | 83/856 |
| 4,573,387 | 3/1986 | Denter et al. | 83/856 |

Primary Examiner—Frank T. Yost
Attorney, Agent, or Firm—Arthur T. Fattibene

[57] ABSTRACT

A guide regulator plate for vegetable preparing devices, consisting of pivotable member-supporting recesses provided at the left and right end portions of a body frame of a vegetable preparing device, opened in the end surfaces of the body frame and formed in the shape of the letter "C" in a front elevation thereof, pivotable supporting pins projecting from the left and right side surfaces of the guide regulator plate and formed so that the pins can be inserted into the recesses from their end openings, and left and right holding portions of a holder of the device, which are formed so that the holding portions can be inserted in the portions of the recesses which are on the rear side of the supporting pins to thereby enable the holding portions to close the openings of the recesses. The guide regulator plate according to the present invention enables the disassembling, reassembling and washing of the constituent parts of the vegetable preparing device to be done easily, and the thickness to which a vegetable is to be cut to be regulated smoothly.

1 Claim, 6 Drawing Figures

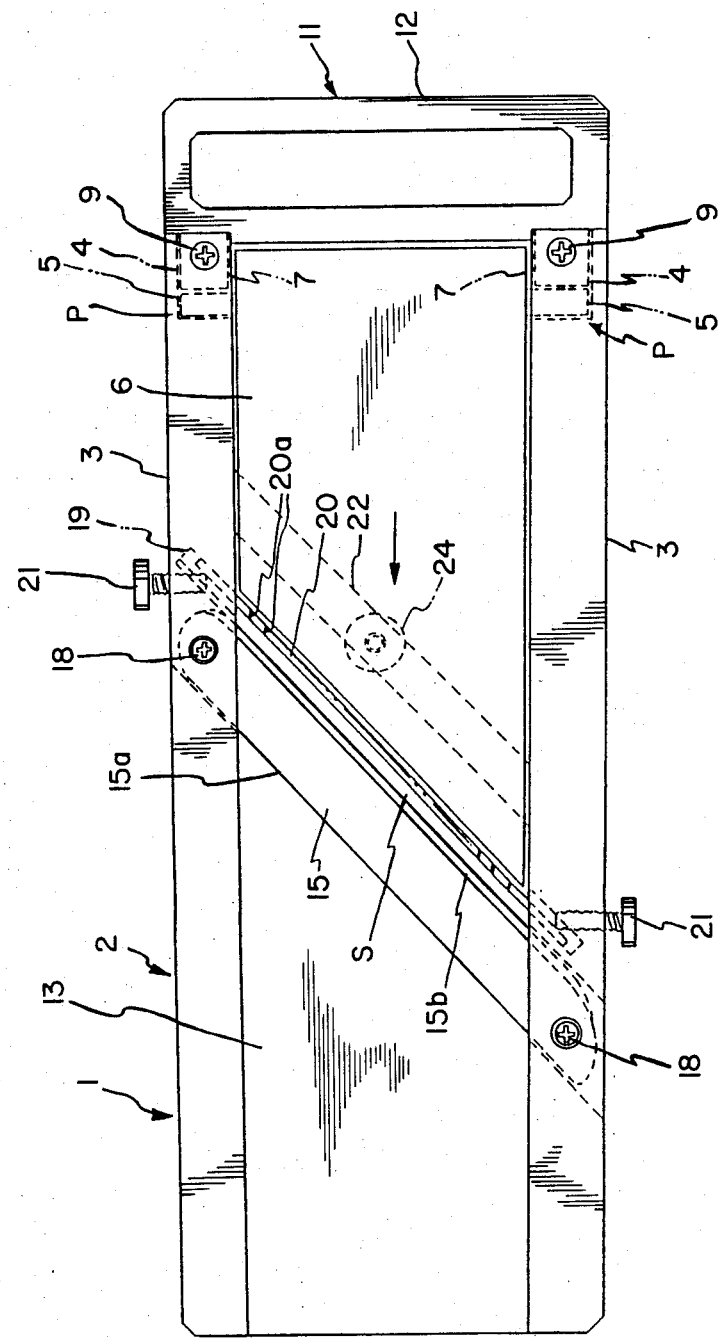
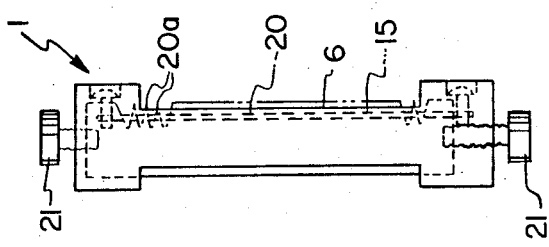

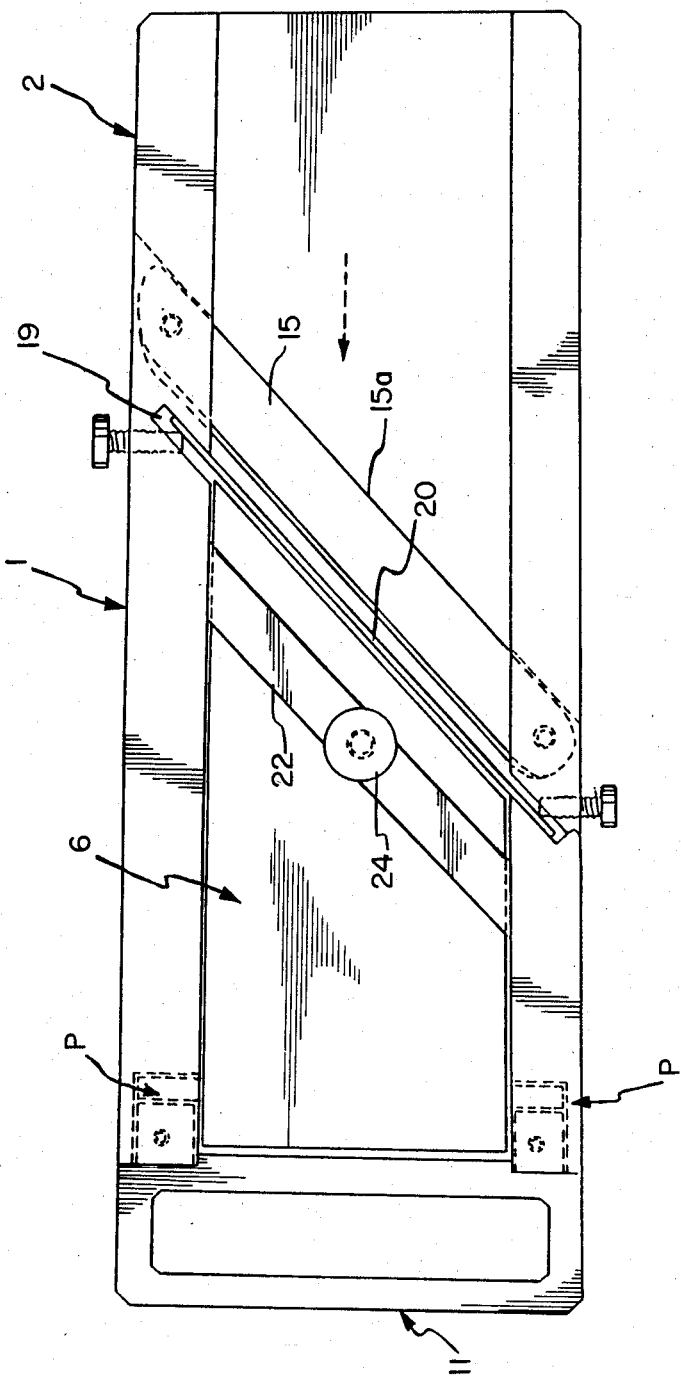

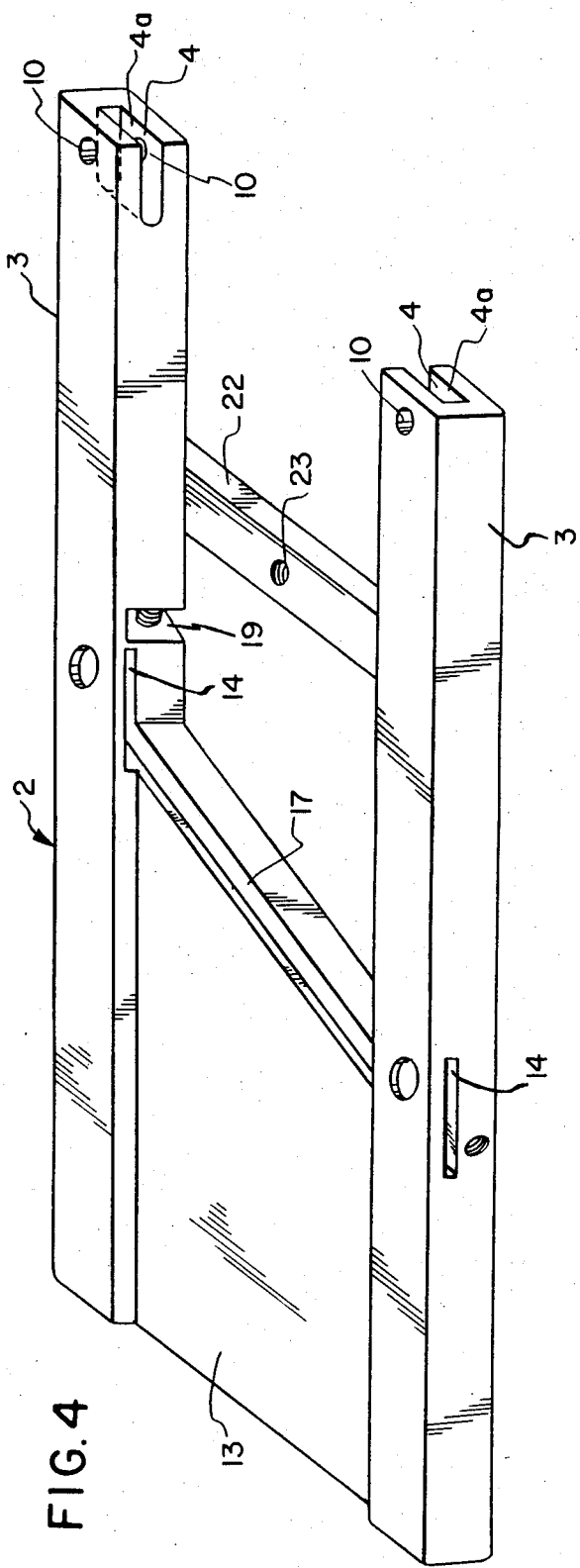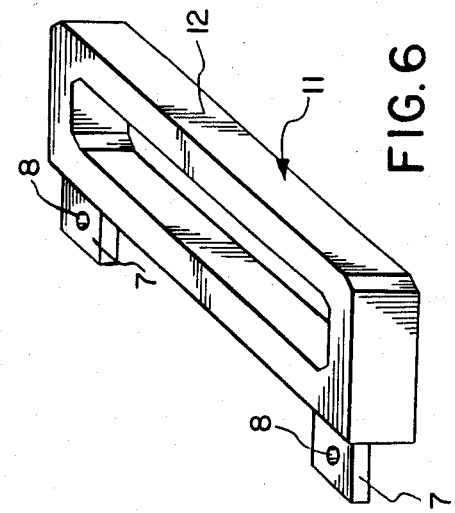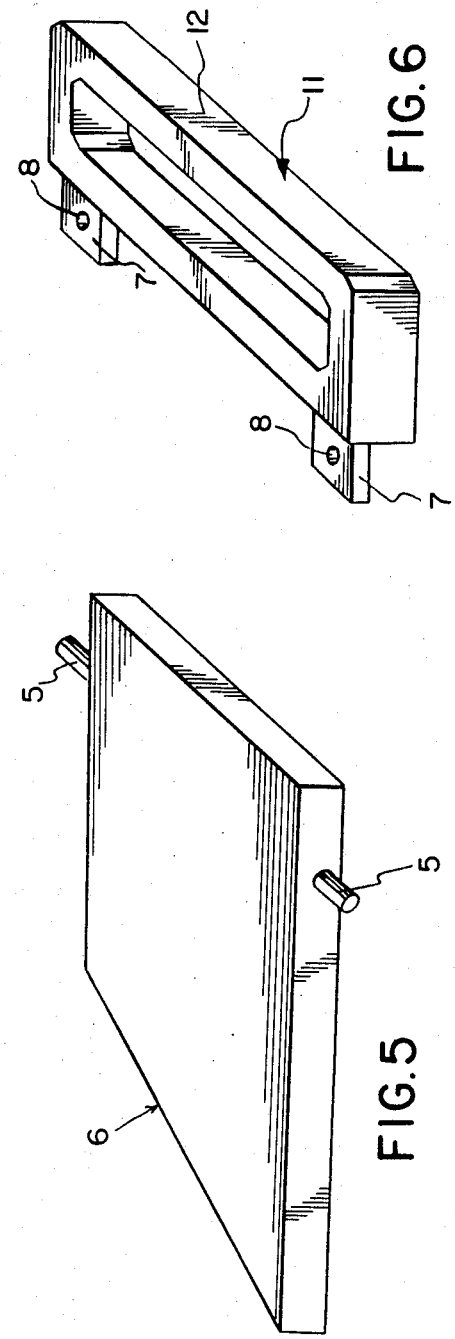

GUIDE REGULATOR PLATE FOR VEGETABLE PREPARING DEVICES

BACKGROUND OF THE INVENTION:

1. Field of the Invention

This invention relates to a guide regulator plate for a vegetable preparing device which is used to cut a vegetable in round slices or in thin strips like a garnish served with sliced raw fish, the guide regulator plate having the functions of guiding a vegetable to a blade of the vegetable preparing device and regulating the thickness to which the vegetable is to be cut.

2. Description of the Prior Art

There is a conventional vegetable preparing device of this kind known by Japanese Utility Model Publication No. 21245/1977, in which a base portion (a portion far away from a flat blade and a comb-like blade) of a guide regulator plate, which is adapted to guide a vegetable to the flat blade and comb-like blade which are fixed to a body frame of the device, is joined pivotably to an end portion of the body frame by using support pivots consisting of bolts, a free turning edge of this guide regulator plate being turned vertically with respect to the flat blade and comb-like blade so as to regulate the lengths of the portions of these blades which project from the guide regulator plate, whereby the thickness to which the vegetable is to be cut can be regulated.

However, in the pivotably supported portions of the guide regulator plate in this known vegetable preparing device, long bolts are inserted into the guide regulator plate and the left and right portions of the body frame which are on the outer side of the guide regulator plate, in the above-mentioned manner, so that fine vegetable chips readily enter and gather in the clearances between the bolts and the bores in which they are inserted. Therefore, the operation of the pivotable portions tends to become dull, and the smoothness of the operation for regulating the thickness to which the vegetable is to be cut is lost. Moreover, it becomes difficult in many cases due to the clogged pivotable portions to turn the guide regulator plate greatly for the purpose of eliminating the vegetable chips which are apt to gather in a space in the vicinity of the comb-like blade. It is necessary every time the vegetable preparing device finishes being used that the comb-like blade and guide regulator plate be separated from the body frame so that each part of the device can be satisfactorily washed. It is difficult to remove the long bolts, and, especially, to insert these bolts into the relative bores during the reassembling of the device since the insertion of these bolts is done after the small bores in the pivotable portions have been aligned with each other. Namely, aligning these bores is very difficult. In addition, it takes much labor to remove the vegetable chips collected in a hardened state in the thin boltsupporting bores in the pivotable portions.

Summary of the Invention

Therefore, it is an object of the present invention to provide a guide regulator plate for vegetable preparing devices, which is free from these drawbacks encountered in a conventional guide regulator plate of this kind. The guide regulator for vegetable preparing devices according to the present invention, in which a guide regulator plate adapted to guide a vegetable toward a blade fixed to a body frame of the device is supported pivotably on the body frame so that the length of a projecting portion of the blade can be regulated, consists of pivotable member-supporting recesses each of which is provided at the left or right end portion of the body frame and opened in the end surface of this end portion, and each of which is substantially in the shape of the letter "C" in its front elevation, pivotable supporting pins projecting from the left and right side surfaces of the guide regulator plate and formed so that these pins can be inserted into the pivotable member-supporting recesses from their end openings, and left and right holding portions of a holder, which are formed so that the holding portions can be inserted in such portions of the pivotable member-supporting recesses that are on the rear side of the inserted supporting pins to thereby enable the holding portions to close the openings of the pivotable member-supporting recesses, this holder being fixed to the body frame by slip-preventing members. The assembling and disassembling of the pivotable portions of this device can be done easily by laterally inserting or withdrawing the holding portions of the holder into or from the pivotable member-supporting recesses which are opened in the end portions of the body frame. The parts of this device which are in the vicinity of the pivotable member-supporting recesses can also be washed very easily by utilizing the end openings of these recesses.

The above and other objects as well as advantageous features of the invention will become apparent from the following description of the preferred embodiment taken in conjunction with the accompanying drawings.

BRIEF DESCRIPTION OF THE DRAWINGS

The accompanying drawings show an embodiment of the present invention, wherein:

FIG. 1 is a plan view of a vegetable preparing device;

FIG. 2 is a left side elevation of the device of FIG. 1;

FIG. 3 is a bottom view of the device of FIG. 1;

FIG. 4 is a perspective view of a body frame;

FIG. 5 is a perspective view of a guide regulator plate; and

FIG. 6 is a perspective view of a holder.

DESCRIPTION OF THE PREFERRED EMBODIMENT

An embodiment of the present invention will now be described with reference to the drawings. FIG. 1 is a plan view of an example of a vegetable preparing device, FIG. 2 a left side elevation of the device, and FIG. 3 a bottom view of the same device of FIG. 1. A body 1 of this vegetable preparing device consists of a body frame 2 shown in FIG. 4, a guide regulator plate shown in FIG. 5, having left and right pivotable supporting pins 5, 5 and capable of being turned vertically around these pins 5, 5 as fulcrums with the pins 5, 5 inserted in pivotable member-supporting recesses 4, 4 provided in the end portions of left and right frame members 3, 3 of the body frame 2, and a holder 11 shown in FIG. 6, having holding portions 7, 7 inserted in the rear portions of the recesses 4, 4 which are left after the pins 5, 5 have been inserted therein, and positioning the pins 5, 5 by screwing or inserting slip-preventing members 9, 9, for example, screws or pins, which are inserted through bores 8, 8 in the holding portions 7, 7, into bores 10, 10 in the left and right frame members 3, 3, whereby the holder 11 is fixed to the body frame 2. In this embodiment, the body frame 2, guide regulator plate 6 and holder 11 are all formed of a hard synthetic resin so as to prevent them from being rusted and changed in quality. The pivotable member-supporting recesses 4 are substantially in the shape of the letter "C" in a front elevation of the end portions of the left and right frame members 3, 3, and formed so that the recesses 4 have openings 4a opened in these end portions. The left and right pivotably supporting pins 5, 5 of the guide regulator plate 6 are inserted from these openings 4a, 4a into the recesses 4, 4, and the left and right holding portions 7, 7 of the holder 11 from the same openings 4a, 4a into the same recesses 4, 4. Consequently, the openings 4a, 4a are closed with the holding portions 7, 7, and the pivotable supporting pins 5, 5 are rendered substantially only pivotable as they are surrounded by the rear, upper and lower surfaces of the recesses 4, 4 and the rear end surfaces of the holding portions 7, 7. The recesses 4 and these parts having relation therewith are formed in this manner. The pivotable member-supporting recesses 4, 4 thus provided in the body frame 2, left and right pivotable supporting pins 5, 5 and left and right holding portions 7, 7 of the holder 11 form pivotable portions P which are capable of vertically turning the guide regulator plate 6.

The holder 11 in this embodiment is provided with a bore in which a hand can be inserted, to form a handle 12. In order to use the vegetable preparing device practically, the handle 12 is gripped by, for example, the left hand, and the device body 1 is supported in a dish so that the guide portion 13 of the body frame 5 is in a lower position. A vegetable is then moved slidingly by the right hand to enable the device-holding operation to be done reliably.

A flat blade 15, which is inserted at the left and right portions thereof into recesses 14, 14 in the left and right frame members 3, 3, and which is supported at a rear portion 15a thereof on a stepped portion 17 provided at an end of the guide portion 13 of the body frame 2, is fixed by screws 18, 18 engaged with threaded bores in the left and right frame members 3.3. The left and right mounting portions of a comb-like blade 20 are inserted into recesses 19, 19 in the left and right frame members 3, 3 and fixed to the same frame members 3, 3 by screws 21, 21 driven thereinto. Thus, the comb-like blade 20 is positioned near an edge 15b of the flat blade 15 and held on the body frame 2 as it is inclined in the lengthwise direction (direction of an arrow in which the vegetable is slidingly moved) of the body 1 of the vegetable preparing device.

The guide regulator plate 6 is supported at the lower portion thereof on an adjusting screw 24 which is engaged with a threaded bore 23 in a stay 22 formed integrally with the left and right frame members 3, 3. Accordingly, if the depth to which this adjusting screw 24 is driven is varied, the lengths of the portions of the edge 20a of the comb-like blade 20 the flat blade 15 which project from a vegetable slide-guiding surface, i.e. the upper surface of the guide regulator plate 6 in the upward direction can be regulated, so that the thickness to which the vegetable is to be cut can be varied. The vegetable is rived by the comb-like blade 20 and sliced into elongated pieces, which drop through a gap S between the comb-like blade 20 and the edge 150b of the flat blade 15. If the flat blade 15 alone is used with the comb-like blade 20 removed, thin, round sliced pieces of vegetable can be obtained. The guide regulator 6 can be turned around the pivotable supporting pins 8, 8 so as to separate the central portion thereof surfficiently from the comb-like blade 20. Therefore, the removal of the vegetable chips collected on the comb-like blade 20 and in the gap S can be easily done.

The vegetable slide-guiding surfaces of the guide portion 13 of the body frame 5 and the guide regulator plate 6 are provided with a plurality of projections (not shown) extending in the direction of an arrow, and this enables a vegetable to the moved slidingly with ease. Since both the flat blade 15 and comb-like blade 20 extend diagonally with respect to the vegetable-sliding direction, the power required for cutting the vegetable can be reduced, and these blades have excellent cutting quality. In the above description of the illustrated embodiment, a vegetable preparing device in which both a flat blade 15 and a comb-like blade 20 can be installed is referred to but this invention can also be applied to a vegetable preparing device having a flat blade 15 alone and incapable of being provided with a comb-like blade 20.

The guide regulator plate for vegetable prearing devices according to the present invention is constructed as described above. The pivotable member-supporting recesses 4, 4 provided in the left and right end portions of the body frame 2, opened at these end portions and formed substantially in the shape of the letter "C" in a front elevation thereof, pivotable supporting pins 5, 5 projecting from the left and right side surfaces of the guide regulator plate 6 and formed so that the pins 5, 5 can be inserted into the recesses 4, 4 from the openings 4a, 4a thereof, and the left and right holding portions 7, 7 of the holder 11, which are formed so that the portions of the recesses 4, 4 which are on the rear sides of the pins 5, 5 can be closed therewith form the pivotable portions P. Therefore, the assembling and disassembling of the pivotable portions P are done, for example, in the following manner. To assemble the pivotable portions P, the pins 5, 5 on the guide regulator plate 6 are inserted from the openings 4a, 4a into the recesses 4, 4, and the holding portions 7, 7 of the holder 11 from the openings 4a, 4a into the recesses 4, 4. The slip-preventing members 9, 9 are then inserted through the body frame 2 and holding portions 7, 7 to complete the assembling operation. The disassembling of the pivotable portions P is done by reversing the procedure of the above-described assembling operation. During the assembling and disassembling of the pivotable portions P, the pins 5, 5 and holding portions 7, 7 can thus be inserted and removed laterally into and from the recesses 4, 4 by utilizing the openings 4a, 4a provided at the end portions of the body frame 2. Accordingly, the disassembling and assembling of the constituent parts including the body frame 2, guide regulator plate 6 and blades can be done easily. This enables these constituent parts to be washed or cleaned easily after the device has been used. Especially, the removing of vegetable chips which are apt to be collected in the vicinity of the recesses 4 can be done easily through the openings 4a. The troublesome operation for aligning long bolts with thin pivotable member-supporting bores and the difficulty in cleaning parts in a conventional guide regulator plate of this kind can be omitted and eliminated by the present invention.

The present invention is not, of course, limited to the above embodiment; it may be modified in various ways within the scope of the appended claim.

What is claimed is:

1. A guide regulator plate for vegetable preparing devices wherein a guide regulator plate adapted to guide a vegetable toward a blade fixed to a body frame of a vegetable preparing device is supported pivotably on said body frame so that the length of a projecting portion of said blade can be regulated, comprising pivotable member-supporting recesses each of which is provided at the left or right end portion of said body frame and opened in the end surface of said end portion, and each of which is substantially in the shape of the letter "C" in its front elevation, pivotable supporting pins projecting from the left and right side surfaces of said guide regulator plate and formed so that said pins can be inserted into said recesses from their end openings, and left and right holding portions of a holder, which are formed so that said holding portions can be inserted in the portions of said recesses which are on the rear side of said supporting pins to thereby enable said holding portions to close said openings of said recesses.

* * * * *